(12) United States Patent
Laird

(10) Patent No.: US 7,154,531 B2
(45) Date of Patent: Dec. 26, 2006

(54) DETECTING OBJECTS BY DIGITAL IMAGING DEVICE

(75) Inventor: Edward T. Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 627 days.

(21) Appl. No.: 10/279,350

(22) Filed: Oct. 24, 2002

(65) Prior Publication Data

US 2003/0118237 A1 Jun. 26, 2003

Related U.S. Application Data

(60) Provisional application No. 60/348,481, filed on Oct. 26, 2001.

(51) Int. Cl.
*H04N 7/18* (2006.01)

(52) U.S. Cl. ............. 348/135; 348/137; 348/94; 348/152

(58) Field of Classification Search ............ 348/94–95, 348/135, 137, 152, 156, 153, 219; 235/462.41
See application file for complete search history.

(56) References Cited

U.S. PATENT DOCUMENTS

| 4,458,266 A | * | 7/1984 | Mahoney ............... 348/155 |
| 4,837,636 A | | 6/1989 | Daniele et al. |
| 5,253,070 A | * | 10/1993 | Hong ................. 348/155 |
| 6,456,320 B1 | * | 9/2002 | Kuwano et al. .......... 348/143 |
| 6,496,220 B1 | * | 12/2002 | Landert et al. .......... 348/143 |
| 6,841,780 B1 | * | 1/2005 | Cofer et al. ........... 250/341.1 |

\* cited by examiner

*Primary Examiner*—David Ometz
*Assistant Examiner*—Nicholas G. Giles
(74) *Attorney, Agent, or Firm*—Fitch, Even, Tabin & Flannery

(57) ABSTRACT

A system for detecting objects includes a digital image device such as CCD camera to control a defined area for unauthorized intrusions. The digital imaging device views a predetermined pattern positioned across the defined area from the device. A processor periodically compares an image stored in the memory with a digital representation of the predetermined pattern, and a signal is sent to a control unit when the correlation is missing as a result of the object entering field of vision of the digital imaging device and obscuring said predetermined pattern.

10 Claims, 2 Drawing Sheets

DETECTING OBJECTS BY DIGITAL IMAGING DEVICE

This application claims the benefit of U.S. Provisional Application No. 60/348,481 filed Oct. 26, 2001 which is hereby incorporated by reference.

BACKGROUND OF THE INVENTION

The invention relates to detecting an object within a defined area using a digital imaging device, such as a CCD camera.

It is known to use two infrared detectors aligned across a defined area to detect intrusion into the area. Such IR detectors are used, for example, for garage doors and installed at the sides of the door opening. One of the detectors, a IR source send an IR ray to a receiver, or IR sensor aligned with the IR source located across the door opening. However, the function of the IR detectors is limited to detecting an interruption of the IR ray, and the detectors need precise alignment, which provide certain difficulties during their installation. Also, both detectors need wiring in order to be electrically connected to a power source and to a control unit.

There is a need for a simple, inexpensive detection device which is easy to install and which is able to control intrusions in a defined area as well as to provide some other function such as determining the position of the barrier and the velocity of the barrier movement when used with a barrier movement operator.

DETAILED DESCRIPTION OF THE PREFERRED EMBODIMENTS

The system for detecting objects includes a digital image device such as CCD camera to control a defined area for unauthorized intrusions.

Figure 1:
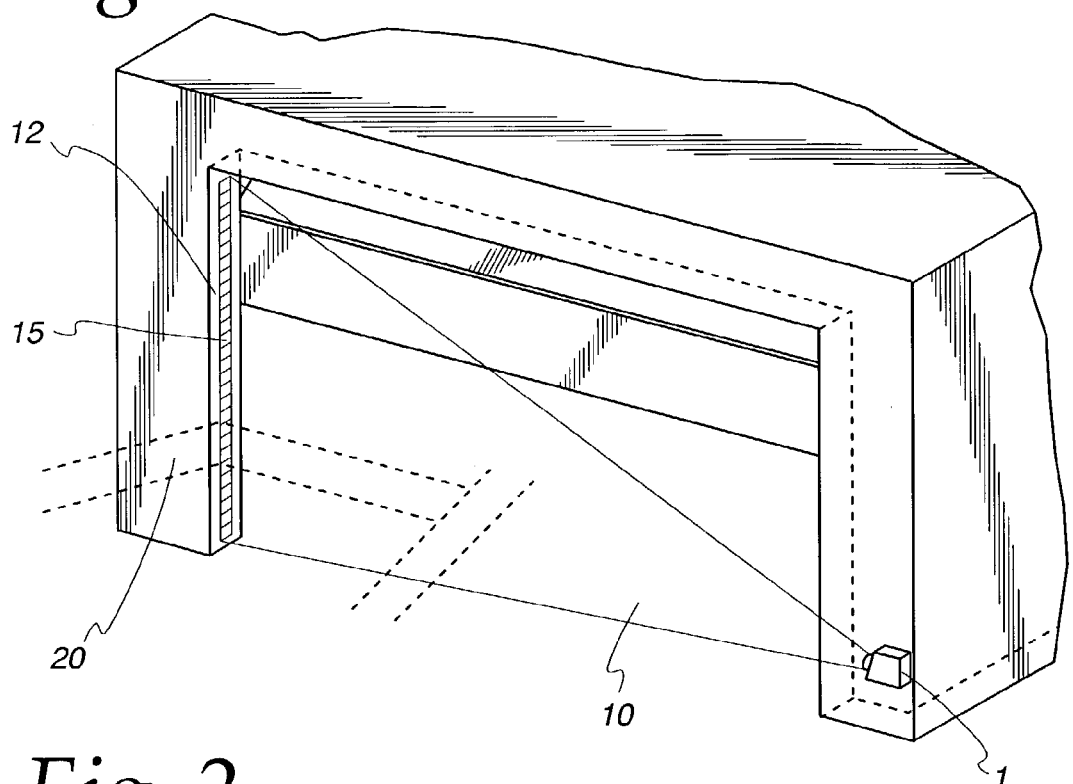
FIG. 1 shows the system of the present invention.

FIG. 1 shows a system for detecting an object entering a region monitored for obstructions by a CCD camera 1 located outside the garage. The camera has a rectangular frame and for example a scan rate of 30 frames/sec, and includes a digital processor for processing images from the CCD and a memory. It may include an enclosed power source such as a battery, or have an independent AC power source. The CCD camera is installed adjacent to the garage door opening so that to view the entire opening. The CCD camera of present embodiment uses a small, rectangular piece of silicon called a charge-coupled device (CCD) to receive incoming light. This silicon wafer is a solid-state electronic component which is micro-manufactured and segmented into an array of individual light-sensitive cells called "photosites." Each photosite is one element of the whole picture that is formed, thus it is called a picture element, or "pixel." The more common CCDs found in camcorders and other retail devices have a pixel array that is a few hundred photosites high by a few hundred photosites wide (e.g., 500×300, or 320×200), yielding tens of thousands of pixels. Since most CCDs are only about ¼" or ⅓" square, each of the many thousands of pixels are only about 10 millionths of a meter (about 4 ten-thousandths of an inch) wide. The CCD photosites accomplish their task of sensing incoming light through the photoelectric effect releasing electrons when hit with photons of light. The electrons emitted within the CCD are fenced within nonconductive boundaries, so that they remain as electric charge within the area of the photon strike. As long as light is allowed to impinge on a photosite, charge will accumulate in that pixel. When the source of light is extinguished (e.g., the shutter is closed), simple electronic circuitry and a microprocessor or computer are used to unload the CCD array, record the amount of charge in each pixel, and process the resulting data into an image, or a digital representation, digital "map" of an image.

A pattern 15, which may be similar to a bar code is positioned on the side wall 12 of the door opening 10 to be viewed, its digital representation recognized by the CCD camera. First, the camera 1 is generally aimed onto the side wall 12 with the pattern 15 in such a way that the camera looks across the door opening 10 to the pattern on the wall 12. In general, the CCD camera may be located outside or inside the garage. The CCD camera views the pattern and stores the image of said pattern 15 in the memory. Also, the image of the pattern may be previously stored in the memory of the camera by manufacturer, and the pattern is provided for installation together with the CCD camera. When the camera is observing the door opening with the pattern, the images are analyzed by the software of the processor and correlated pixel by pixel. When an object enters the field of vision of the camera, it interrupts the viewing of the recognized pattern, obscuring the part 20 of the pattern. The digital representation is analyzed by the CCD memory, the software searches the stored images and, when correlation is not found, the object is considered an intrusion, and a signal is sent to the head unit of the garage door operator (not shown) to initiate an alarm.

Figure 2:
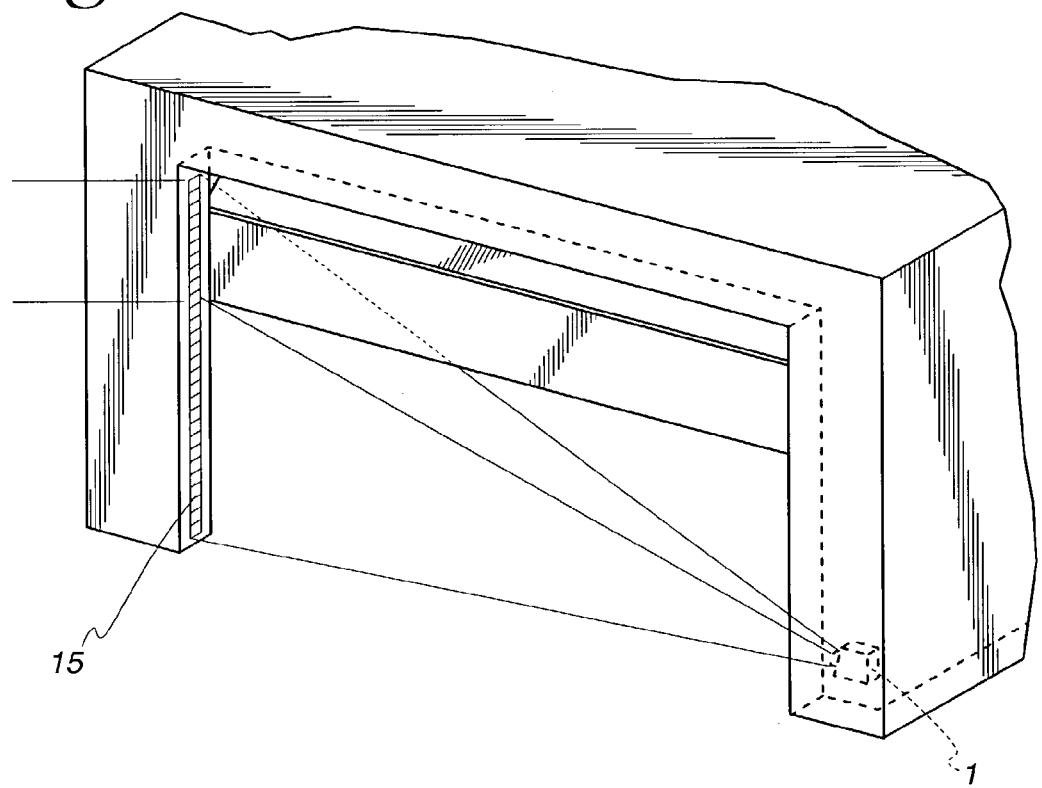
FIG. 2 shows a the method of determining a position of a movable door in accordance with the present invention.

FIG. 2 shows a CCD camera 1 inside the garage and a pattern 15 on the outside wall of the garage door opening. The pattern is in the field of view of the camera in such a way that when the door moves downward or upward, it partially obscures the pattern. The software recognizes the door movement from any other moving object within the defined region by the continual progressive nature of its movement. While the door moves downward gradually obscuring an increasing part of pattern 15, the camera stores the gradually changing representation of the pattern as a sequence of codes, so that the representation of the pattern partially obscured by the door would be recognized by the camera. The CCD software reads the representations of gradually changing pattern as a sequence of codes resulting from movement of the door and correlates them with codes from the sequence of codes stored in the memory for images if the pattern during the door closing/opening. This way the position of the door may be defined from the visible (or obscured) part of the pattern. Also, by reading a certain code (or recognizing a part of the pattern) the software of the CCD processor may optically verify the door position and the velocity of the door movement in any certain moment. When an unexpected object obscures the field of view of the CCD camera, the software analyses the digital representations by correlating them pixel by pixel with the stored images, and reports the results to the head unit of the garage door operator.

Figure 3:
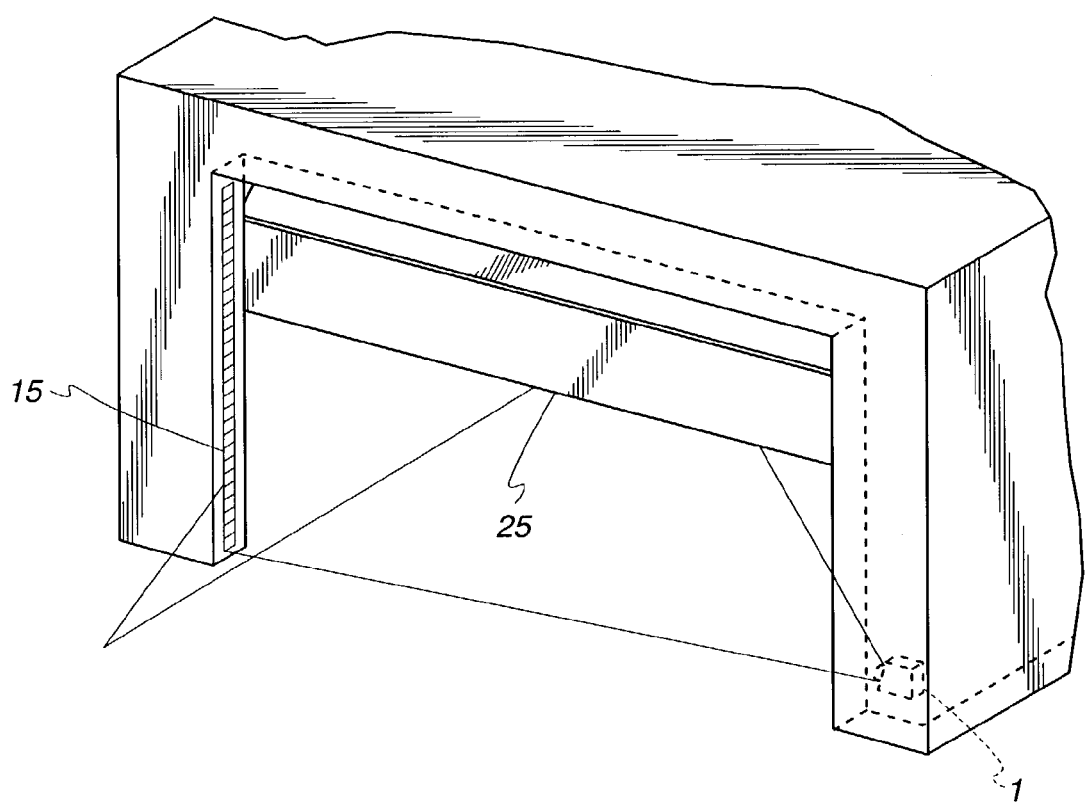
FIG. 3 shows another embodiment of the present invention.

In another embodiment, in addition to the pattern positioned on the side of the door opening, a second recognizable pattern is placed on the bottom edge of the door. The performance of the system in this case depends on certain characteristics, such as optical resolution, field of view and processing power. FIG. 3 shows a camera located inside the garage while one pattern 15 is placed on the side wall of the garage door opening and another pattern 25 is placed on the bottom edge of the door. In this case the entire area of the door opening is protected from intrusion. The movement of the door obscures the pattern from the CCD, however, the software recognizes the door movement from any other moving object within the defined region. The position of the door and the velocity of the door in case of two predetermined patterns is determined by the ratio between the digital representations of visible parts of the patterns. The system including two patterns provides compensation for the changing aspect ratio due to the movement of the door, and reduces or eliminates potentially uncovered areas.

What is claimed is:

1. A system for detecting an object entering a movable barrier opening, comprising:
   a digital imaging device to observe a movable barrier opening and having a memory with a stored image of a pattern, and a processor; and
   a predetermined pattern positioned on a side wall across the movable barrier opening from the digital imaging device;
   wherein, said processor periodically compares the image stored in memory with a digital representation of said predetermined pattern viewed by said device for correlation.

2. The system of claim 1, wherein a signal is sent to a control unit when the correlation is missing as a result of the object entering field of vision of the digital imaging device and obscuring said predetermined pattern.

3. The system of claim 1, wherein the digital imaging device is a CCD camera.

4. A system of detecting an object entering a movable barrier opening, comprising:
   a predetermined pattern positioned on a sidewall of the barrier opening;
   a digital imaging device located in the vicinity of an opposite side wall of the barrier opening so as to have in its field of view said barrier opening and said pattern for generating a digital representation of said pattern viewed across the opening; and
   a processor for periodically comparing the digital representation of the pattern with a stored image of the pattern to determine correlation.

5. The system of claim 4, wherein a moving barrier obscures said predetermined pattern from the field of view of said device changing a visible part of said pattern, and said digital device determines a position of the barrier by correlation of digital representation of said visible part of the pattern with images of said pattern stored in said memory.

6. The system of claim 4, further comprising a second predetermined pattern positioned on a bottom edge of the movable barrier, and said digital imaging device determines a presence of said object by absence of correlation between digital representation of said patterns as obscured by the object and images of said patterns stored in said memory.

7. The system of claim 6, wherein said digital device determines a position of the barrier by correlation of a ratio of visible parts of the predetermined patterns with a ratio stored in said memory.

8. The system of claim 4, wherein the digital imaging device is a CCD camera.

9. A method of detecting an object in a movable barrier opening using a digital imaging device, comprising:
   installing a digital imaging device having a memory with a stored image of a pattern to observe the barrier opening;
   placing a predetermined pattern having a digital representation correlated with said stored image on a side wall of the barrier opening and in view of the digital imaging device;
   periodically comparing said stored image with a digital representation of said predetermined pattern viewed by the device for correlation; and
   sending a control signal in absence of correlation indicating intrusion of the object obscuring said predetermined pattern from the view of the digital imaging device.

10. A method of detecting an object according to claim 9, wherein the digital imaging device is a CCD camera.

* * * * *